(12) United States Patent
Kang et al.

(10) Patent No.: US 12,305,056 B2
(45) Date of Patent: May 20, 2025

(54) LIQUID METAL PARTICLE-ASSEMBLED NETWORK SYNTHESIZED IN VARIOUS POLYMERS, AND MANUFACTURING METHOD OF THE SAME

(71) Applicant: Korea Advanced Institute of Science and Technology, Daejeon (KR)

(72) Inventors: Jiheong Kang, Daejeon (KR); Wonbeom Lee, Daejeon (KR); Hyunjun Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/865,571

(22) Filed: Jul. 15, 2022

(65) Prior Publication Data

US 2023/0227681 A1   Jul. 20, 2023

(30) Foreign Application Priority Data

Jan. 14, 2022 (KR) ................ 10-2022-0006108
Mar. 24, 2022 (KR) ................ 10-2022-0036393

(51) Int. Cl.
 C09D 11/52 (2014.01)
 B41M 5/00 (2006.01)
 C09D 7/80 (2018.01)
 C09D 11/023 (2014.01)

(52) U.S. Cl.
 CPC ........... C09D 11/52 (2013.01); B41M 5/0041 (2013.01); C09D 7/80 (2018.01); C09D 11/023 (2013.01)

(58) Field of Classification Search
 CPC ..................................... C09D 11/52
 See application file for complete search history.

(56) References Cited

U.S. PATENT DOCUMENTS

2023/0044133 A1\*   2/2023   Jeong ............... H01B 13/06

FOREIGN PATENT DOCUMENTS

KR   1020210121639 A   10/2021

\* cited by examiner

*Primary Examiner* — William D Young
(74) *Attorney, Agent, or Firm* — Verrill Dana, LLP (57) ABSTRACT

Various embodiments relate to a liquid metal particle-assembled network synthesized in various polymers and a method of manufacturing the same. The liquid metal particle-assembled network is configured to include a polymer matrix, first liquid metal particles spaced apart from each other and disposed within the polymer matrix, and second liquid metal particles that connect the first liquid metal particles between the first liquid metal particles within the polymer matrix. In this case, the size of each of the second liquid metal particles may be smaller than the size of each of the first liquid metal particles.

4 Claims, 13 Drawing Sheets

FIG. 11

LIQUID METAL PARTICLE-ASSEMBLED NETWORK SYNTHESIZED IN VARIOUS POLYMERS, AND MANUFACTURING METHOD OF THE SAME

CROSS-REFERENCES TO RELATED APPLICATIONS

This application is based on and claims priority under 35 U.S.C. 119 to Korean Patent Application Nos. 10-2022-0006108, filed on Jan. 14, 2022, and 10-2022-0036393, filed on Mar. 24, 2022 in the Korean intellectual property office, the disclosures of which are herein incorporated by reference in their entireties.

TECHNICAL FIELD

Various embodiments relate to a liquid metal particle-assembled network synthesized in various polymers and a method of manufacturing the same.

BACKGROUND OF THE DISCLOSURE

Recently, an interest in new fields, such as soft robotics, wearable electronics, bioelectronics, virtual reality, and augmented reality, is increasing. An electronic devices used in such a field requires stretchable electronic devices having excellent electrical properties and mechanical properties. The most important factor of the stretchable electronic device is a stretchable conductor that is responsible for supplying current to electronic components. The stretchable conductor requires high electrical conductivity, excellent mechanical properties, an electrical property that the stretchable conductor is maintained although it is stretched, and an excellent adhesive property with various electronic components for a stable operation of the electronic devices. Stretchable conductors have been widely investigated and studied in the last decade. Materials having high electrical conductivity and excellent elasticity, such as composites in which conductive nanoparticles having a solid form such as silver particles or carbon nanobubes are mixed with polymers and conductive polymers intrinsically having conductivity, were developed. However, conductors having such a structure have a problem in that resistance is abruptly increased because electrons do not flow as a contact between conductive particles through which the electrons can flow is broken when the conductors are stretched.

Liquid metal based on gallium that has a form of liquid at room temperature has received a great attention as a material which may overcome the limits of the existing conductive polymer or conductive solid particle/polymer composites based on high electrical conductivity and freely deformable nature of the liquid metal. However, the use of liquid metal as a conductive material is limited because the liquid metal has weak mechanical properties and a poor adhesive property with various electronic components. In order to impart excellent mechanical properties to liquid metal, research for making the liquid metal small particles and mixing the small particles with polymers was carried out, but the liquid metal-polymer composites show insulating properties because a conductive pathway is not formed due to repulsion between the oxide layer of the liquid metal particles and the insulating nature of oxide layer of liquid metal particles.

For this reason, in order to impart electrical conductivity to the liquid metal-polymer coposites, attempts, such as doping the oxide layer of the liquid metal particles or applying a physical force on the liquid metal particle-polymer composites, were made. For the doping method, the liquid metal has advantages in that a composite of the liquid metal particles and the polymers has a very excellent electrical conductivity without additional treatment and electrical properties of the composites are maintained even when the conductors are stretched. However, as mechanical properties of the polymers are suddenly deteriorated in the process of doping the oxide layer, the doping method has a disadvantage in that the doped composites loses its shape although a weak impact from the outside is applied to the liquid metal. A method of imparting conductivity to liquid metal by applying a physical force has an advantage in that conductivity can be easily imparted to the liquid metal by scratching the liquid metal-polymer composite by using a thin stick. However, the method has a disadvantage in that an unwanted part of the liquid metal-polymer composite may have conductivity when an impact from the outside is applied thereto and disadvantages, such as low electrical conductivity and low resolution of patterning. Such limits are hindering a substantial application of liquid metal as a conductive material.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments provide a new liquid metal particle-assembled network synthesized in various polymers and a method of manufacturing the same.

In various embodiments, a liquid metal particle-assembled network may include a polymer matrix, first liquid metal particles spaced apart from each other and disposed within the polymer matrix, and second liquid metal particles that connect the first liquid metal particles in between the first liquid metal particles within the polymer matrix. The size of each of the second liquid metal particles may be smaller than the size of each of the first liquid metal particles.

In various embodiments, a method of manufacturing a liquid metal particle-assembled network may include manufacturing ink in which a polymer solution and the first liquid metal particles are mixed, forming a composite by using the ink, and forming, on a surface of the first liquid metal particles, the second liquid metal particles that connect the first liquid metal particles in the composite by applying ultrasonic waves. The size of each of the second liquid metal particles may be smaller than the size of each of the first liquid metal particles.

According to various embodiments, the liquid metal particle-assembled network may be implemented as a conductive material having both excellent electrical properties and mechanical properties. Specifically, the liquid metal particle-assembled network may be implemented to have excellent electrical properties, that is, high electrical conductivity, and electrical properties maintained when the liquid metal particle-assembled network is stretched, while maintaining mechanical properties of liquid metal particles and polymer composites, by using a non-destructive method called ultrasonic waves. In this case, if a functional polymer is used in the liquid metal particle-assembled network, the liquid metal particle-assembled network may be implemented to have various functionalities. Such a liquid metal particle-assembled network is a material which can overcome the limits of a common stretchable conductor, and will be widely used in various stretchable electronic electronics, such as soft robotics, wearable electronics, and bioelectronics in the future.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of the present disclosure are described with reference to the accompanying drawings.

Figure 1:
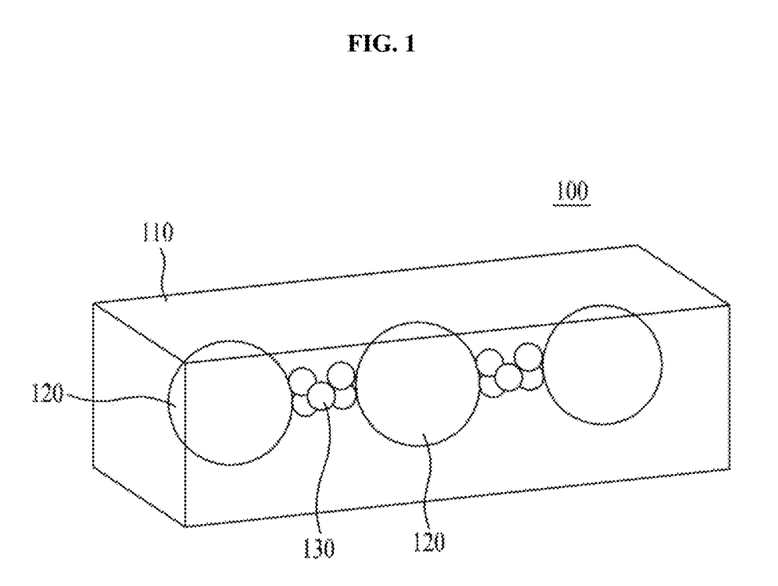
FIG. 1 is a diagram illustrating a liquid metal particle-assembled network according to various embodiments.

FIG. 1 is a diagram illustrating a liquid metal particle-assembled network 100 according to various embodiments.

Referring to FIG. 1, the liquid metal particle-assembled network 100 may include a polymer matrix 110, a plurality of first liquid metal particles 120, and a plurality of second liquid metal particles 130. In this case, the first liquid metal particles 120 and the second liquid metal particles 130 may have different sizes. In this case, the size of each of the first liquid metal particles 120 may be greater than the size of each of the second liquid metal particles 130. For example, the first liquid metal particle 120 may have a micro size, and the second liquid metal particle 130 may have a nano size. Specifically, the first liquid metal particles 120 and the second liquid metal particles 130 may be provided within the polymer matrix 110. The first liquid metal particles 120 may be spaced apart from each other and disposed. The second liquid metal particles 130 may be disposed between the first liquid metal particles 120, and may connect the first liquid metal particles 120. As described above, the first liquid metal particles 120 and the second liquid metal particles 130 may implement a network within the polymer matrix 110 through a direct contact, and thus may form a path along which electrons may move. Accordingly, the liquid metal particle-assembled network 100 may have excellent electrical properties, that is, electrical conductivity.

Figure 2:
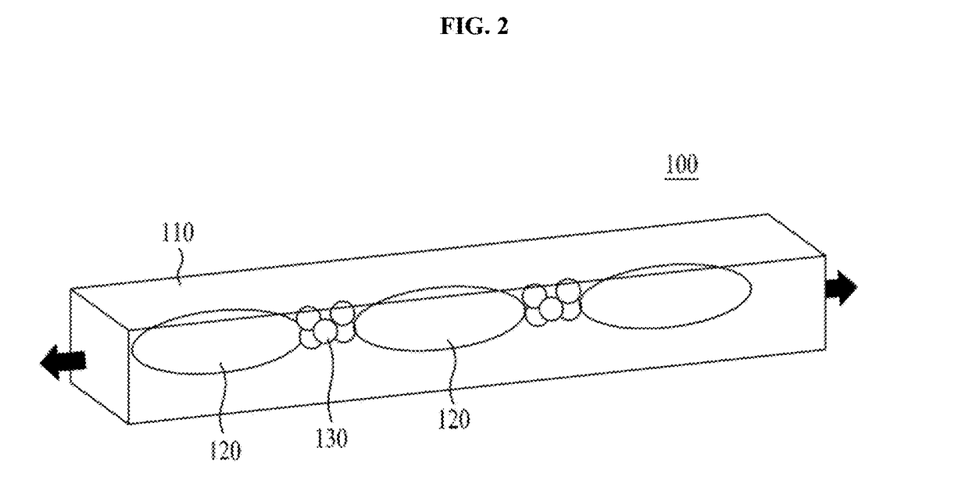
FIG. 2 is a diagram illustrating a shape when the liquid metal particle-assembled network in FIG. 1 is stretched.

FIG. 2 is a diagram illustrating a shape when the liquid metal particle-assembled network 100 in FIG. 1 is stretched.

Referring to FIG. 2, when strain that the liquid metal particle-assembled network 100 is stretched in one direction is applied from the outside to the liquid metal particle-assembled network 100, the liquid metal particle-assembled network 100 may be extended in the one direction. In this case, as the polymer matrix 110 is extended, the first liquid metal particles 120 are also extended within the polymer matrix 110, whereas the second liquid metal particles 130 may be maintained. That is, when the liquid metal particle-assembled network 100 is stretched, the first liquid metal particles 120 are deformed, but the second liquid metal particles 130 can be maintained without being deformed. Accordingly, the second liquid metal particles 130 maintain contacts with the first liquid metal particles 120. Accordingly, excellent electrical properties of the liquid metal particle-assembled network 100 can be preserved.

In this case, a difference between behaviors according to the sizes of the first liquid metal particles 120 and the sizes of the second liquid metal particles 130 may be attributed to surface tension. That is, the property that a shape of liquid of the first liquid metal particle 120 is about to change initiatively acts, so that the first liquid metal particle 120 may be extended by external strain. In contrast, surface tension that an original shape of the second liquid metal particle 130 is about to be maintained initiatively acts, so that the second liquid metal particle 130 may maintain its original shape even by external strain.

Figure 3A:
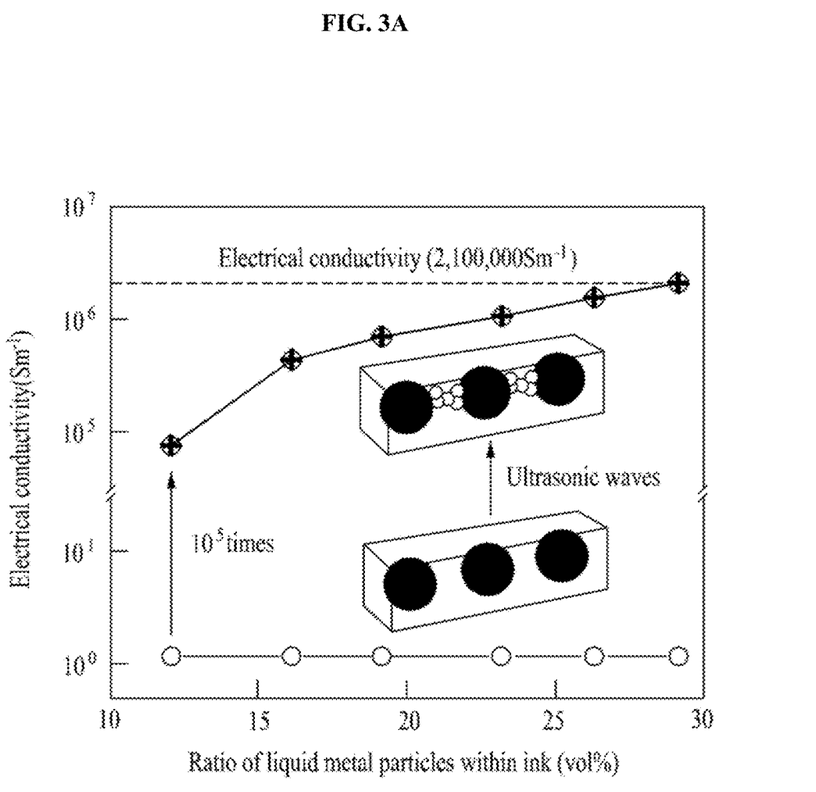
FIGS. 3A and 3B are diagrams for describing electrical properties of the liquid metal particle-assembled network according to various embodiments.
Figure 3B:
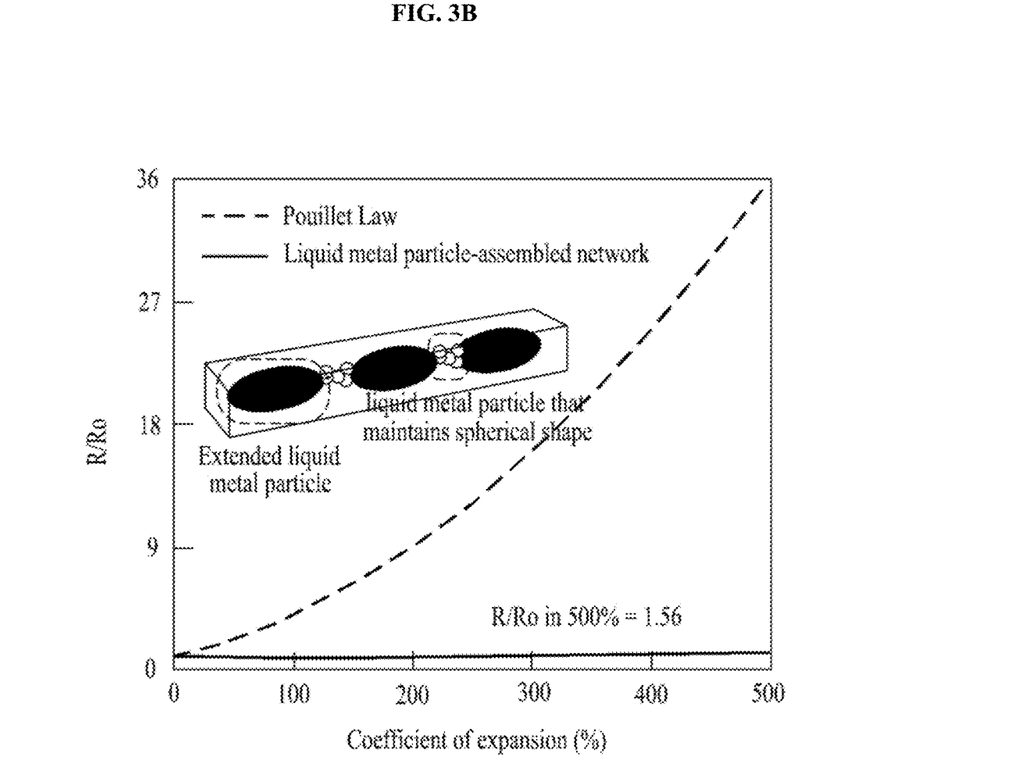

FIGS. 3A and 3B are diagrams for describing electrical properties of the liquid metal particle-assembled network 100 according to various embodiments.

Referring to FIG. 3A, the liquid metal particle-assembled network 100 may have high electrical conductivity because the network includes the second liquid metal particles 130 in addition to the first liquid metal particles 120. That is, if both the first liquid metal particles 120 and the second liquid metal particles 130 are included, the liquid metal particle-assembled network 100 may have electrical conductivity that is about $10^5$ times higher compared to a case where only the first liquid metal particles 120 are included without the second liquid metal particles 130. In this case, the higher the volume ratio of the first liquid metal particles 120 and the second liquid metal particles 130 within the polymer matrix 110, the higher electrical conductivity the liquid metal particle-assembled network 100.

Referring to FIG. 3B, electrical properties of the liquid metal particle-assembled network 100 may be maintained even in external strain. That is, although the coefficient of expansion according to external strain is increased, resistance of the liquid metal particle-assembled network 100 may be rarely changed. This may indicate that electrical properties of the liquid metal particle-assembled network 100 are maintained although the coefficient of expansion according to external strain is increased.

Figure 4:
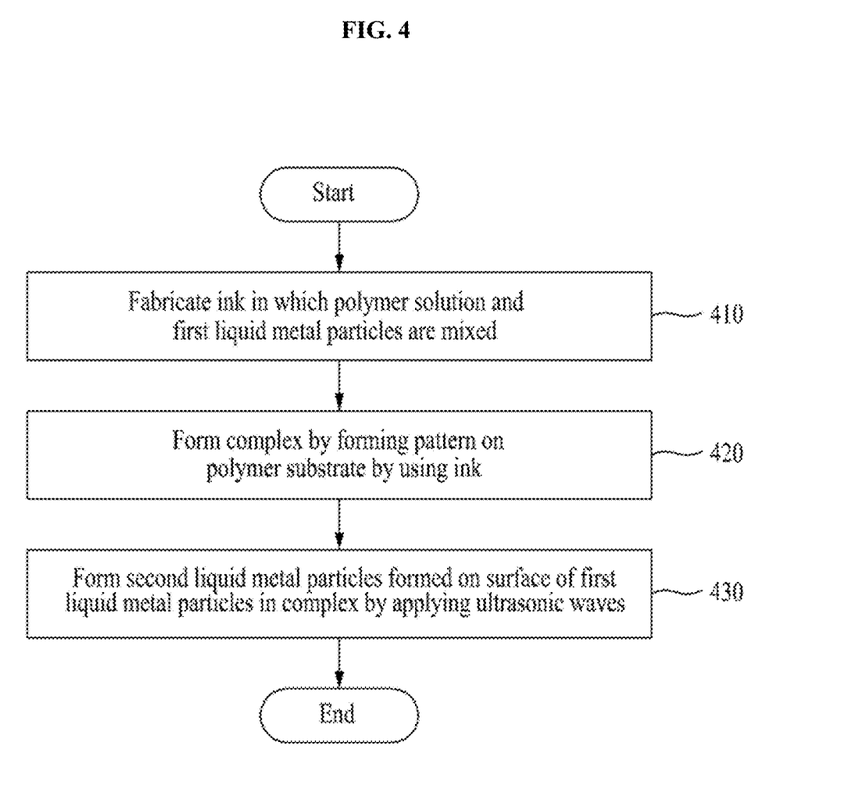
FIG. 4 is a diagram illustrating a method of manufacturing the liquid metal particle-assembled network according to various embodiments.
Figure 5:
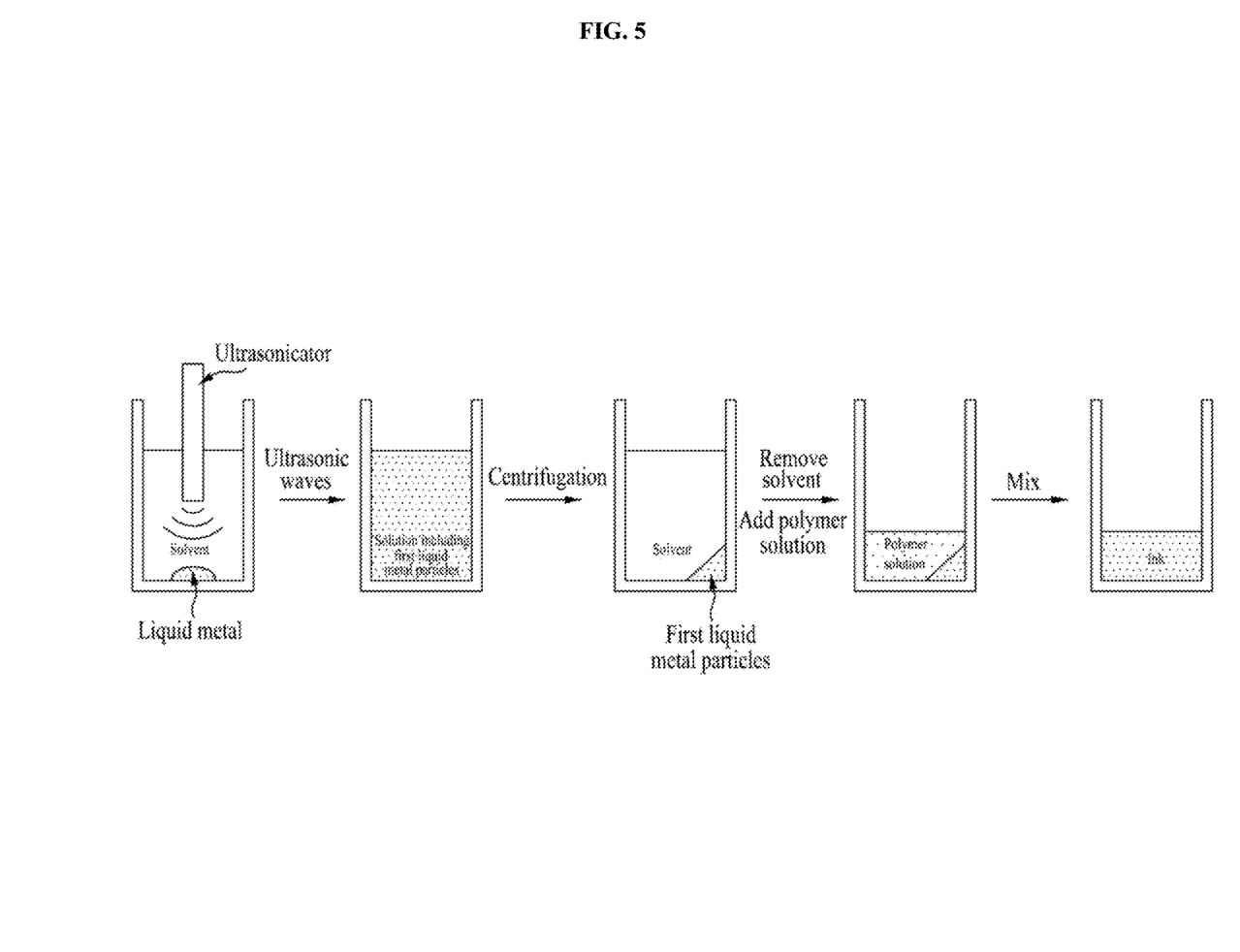
FIGS. 5, 6, and 7 are diagrams for exemplarily describing the method of manufacturing the liquid metal particle-assembled network in FIG. 4.
Figure 6:
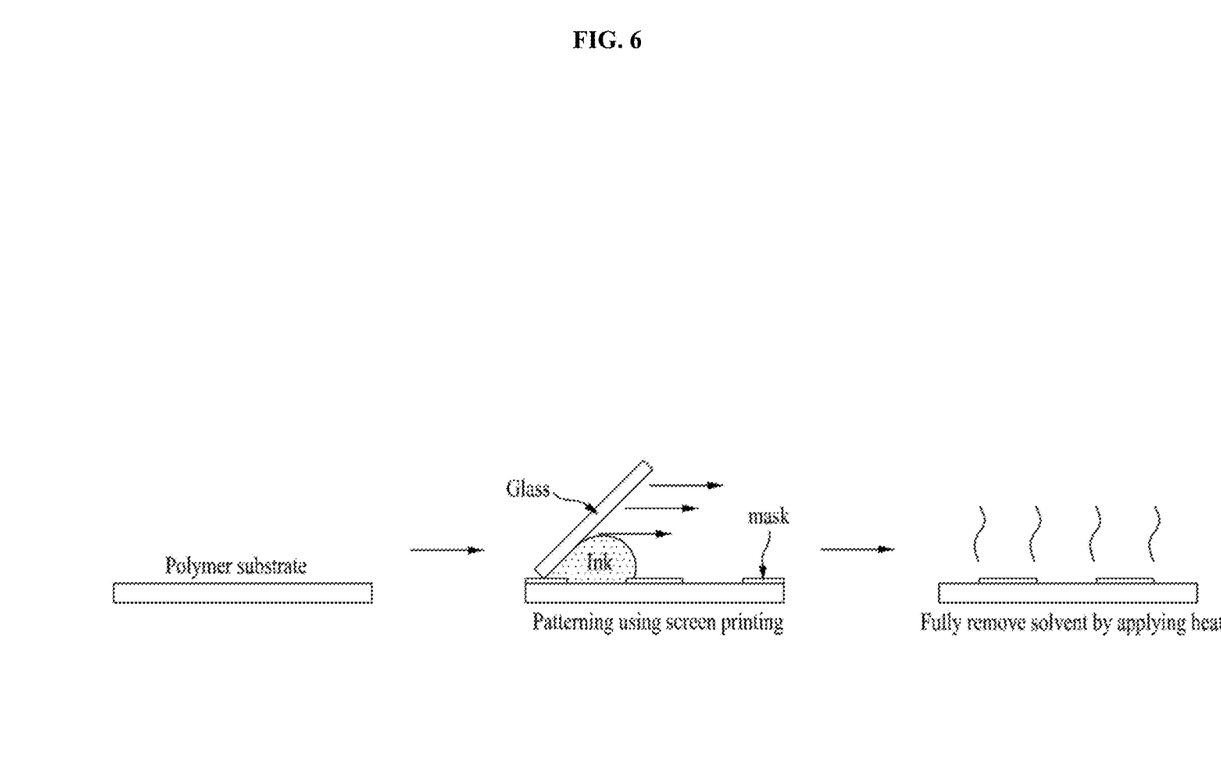
Figure 7:
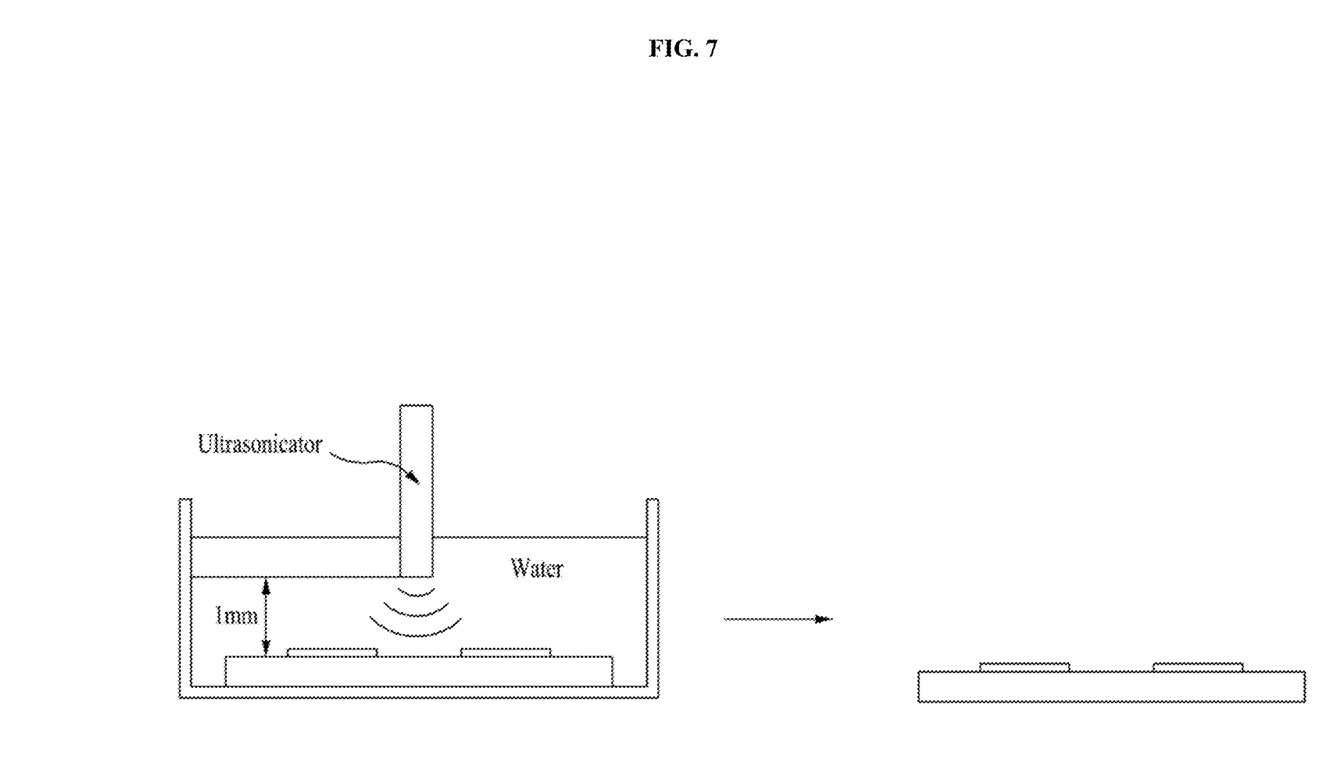

FIG. 4 is a diagram illustrating a method of manufacturing the liquid metal particle-assembled network 100 according to various embodiments. FIGS. 5, 6, and 7 are diagrams for exemplarily describing the method of manufacturing the liquid metal particle-assembled network 100 in FIG. 4.

Referring to FIG. 4, in step 410, ink in which a polymer solution and the first liquid metal particles 120 are mixed may be fabricated. Specifically, according to a procedure illustrated in FIG. 5, the ink may be fabricated. First, after liquid metal is provided to a solvent, a solution including the first liquid metal particles 120 may be prepared by applying ultrasonic waves through an ultrasonicator. For example, the solvent may include at least one of acetone or ethanol. Furthermore, the first liquid metal particles 120 may be precipitated within the solvent by applying the solution to a centrifuge. Accordingly, the solvent may be removed, and thus the first liquid metal particles 120 may be obtained. Thereafter, the ink may be fabricated by mixing the first liquid metal particles 120 and the polymer solution in which polymers are molten in the solvent.

In step 420, a composite may be formed by using the ink. Specifically, according to a procedure illustrated in FIG. 6, the composite may be formed. First, a polymer substrate may be first prepared. Furthermore, a pattern may be formed on the polymer substrate by using the ink. For example, the pattern may be formed on the polymer substrate by using the ink through a scheme, such as nozzle printing or screen printing. Thereafter, the solvent may be fully removed from the pattern on the polymer substrate through heat treatment. Accordingly, the polymer matrix 110 may be formed from the polymer solution of the ink, and the first liquid metal particles 120 may be disposed within the polymer matrix 110 by being spaced apart from each other. That is, the composite having a nonconductor state may be formed. In this case, the composite may have a film form.

Finally, in step 430, the second liquid metal particles 130 may be formed on a surface of the first liquid metal particles 120 in the composite by applying ultrasonic waves. Specifically, according to a procedure illustrated in FIG. 7, the second liquid metal particles 130 may be formed on a surface of the first liquid metal particles 120 in the composite. After the composite is provided within water, ultrasonic waves may be applied to the water by using an ultrasonicator. In this case, the probe of the ultrasonicator may apply the ultrasonic waves to the composite at a distance that is about 1 mm away from the composite. In such a process, as the ultrasonic waves are delivered into the composite, the second liquid metal particles 130 may be formed on a surface of the first liquid metal particles 120. Accordingly, the second liquid metal particles 130 may connect the first liquid metal particles 120 between the first liquid metal particles 120. That is, the first liquid metal particles 120 and the second liquid metal particles 130 may be provided within the polymer matrix 110. As a result, as illustrated in FIG. 1, the liquid metal particle-assembled network 100 may be fabricated.

FIGS. 8A, 8B, 9, 10, and 11 are diagrams for describing the usage of the liquid metal particle-assembled network 100 according to various embodiments.

Figure 8A:
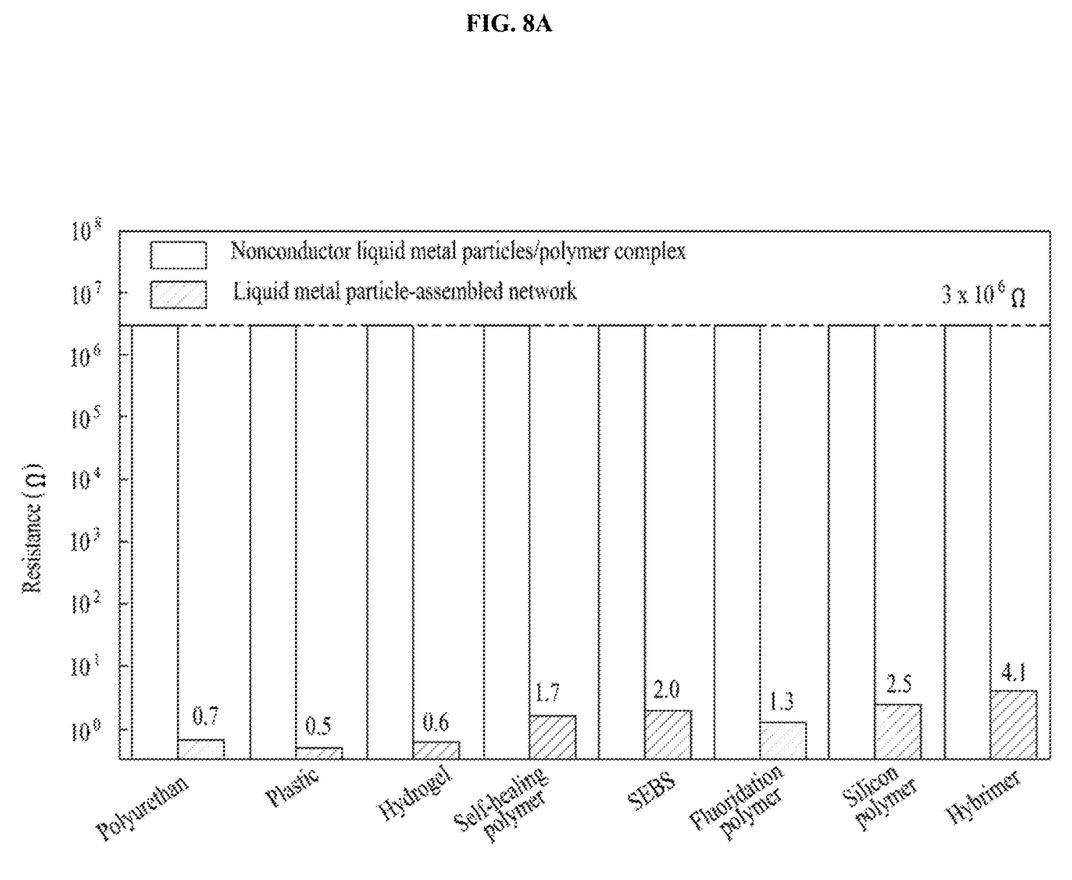
FIGS. 8A, 8B, 9, 10, and 11 are diagrams for describing the usage of the liquid metal particle-assembled network according to various embodiments.
Figure 8B:
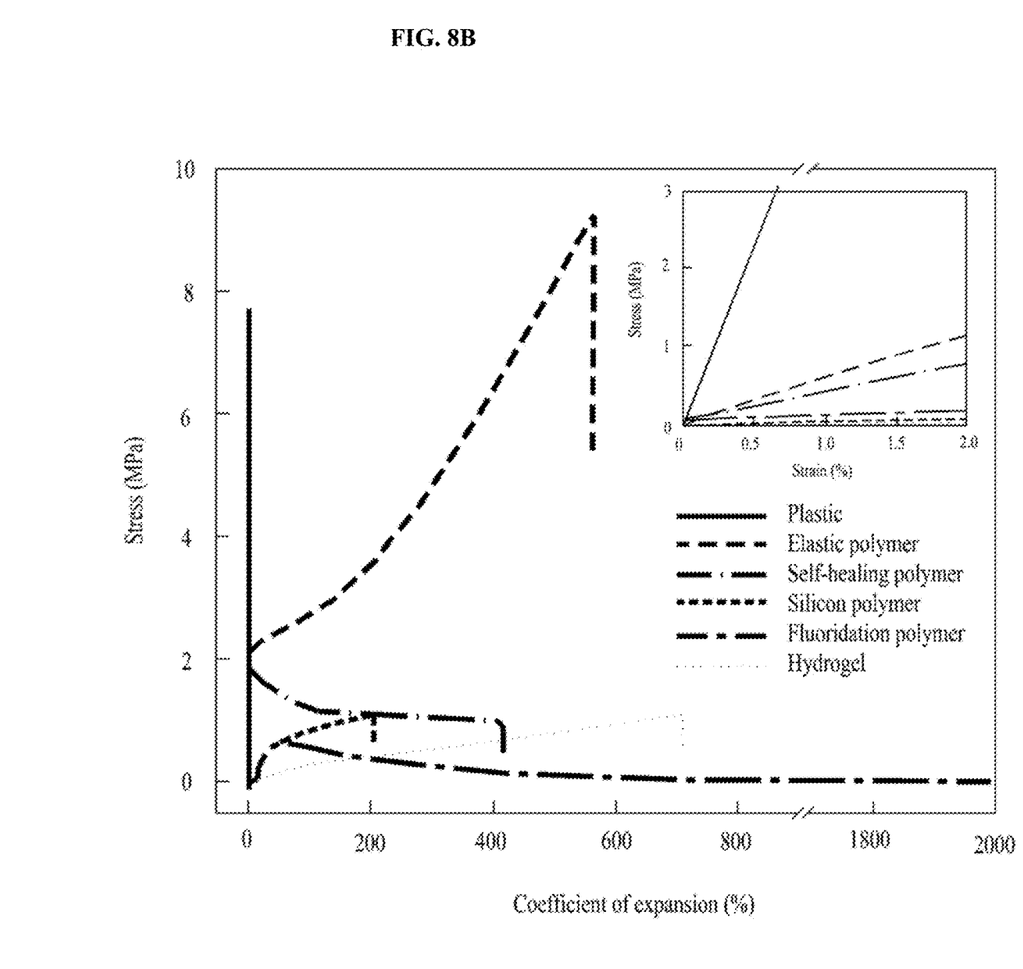
Figure 9:
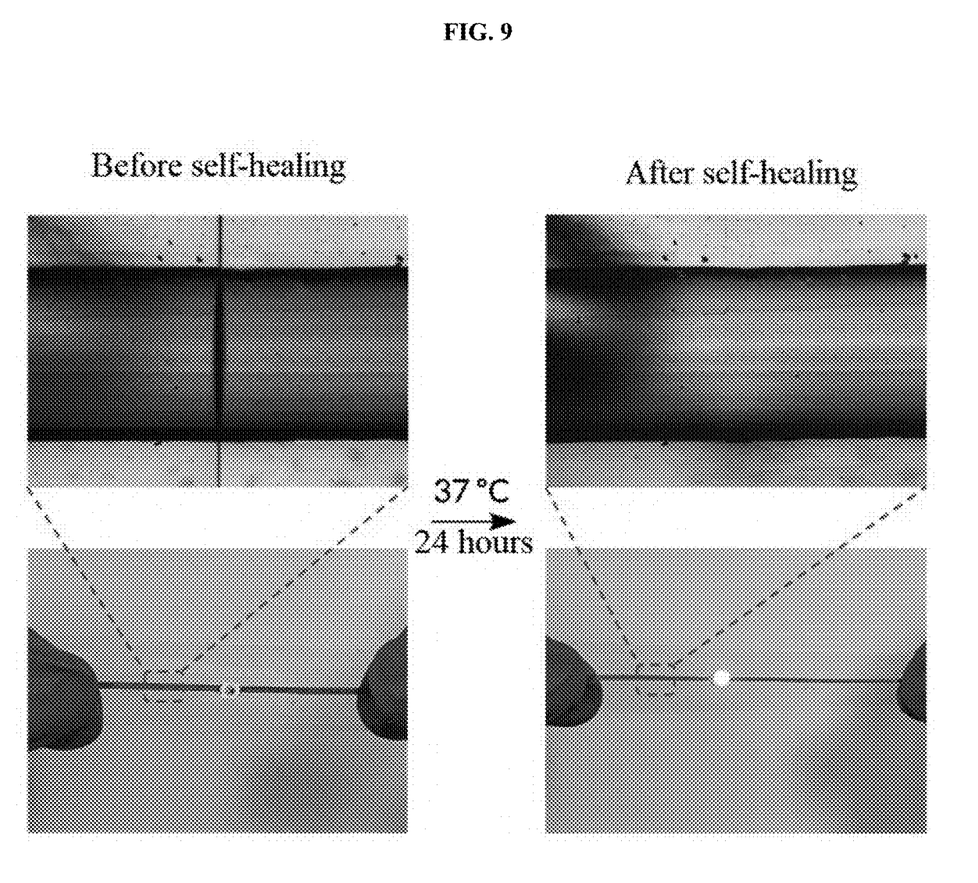
Figure 10:
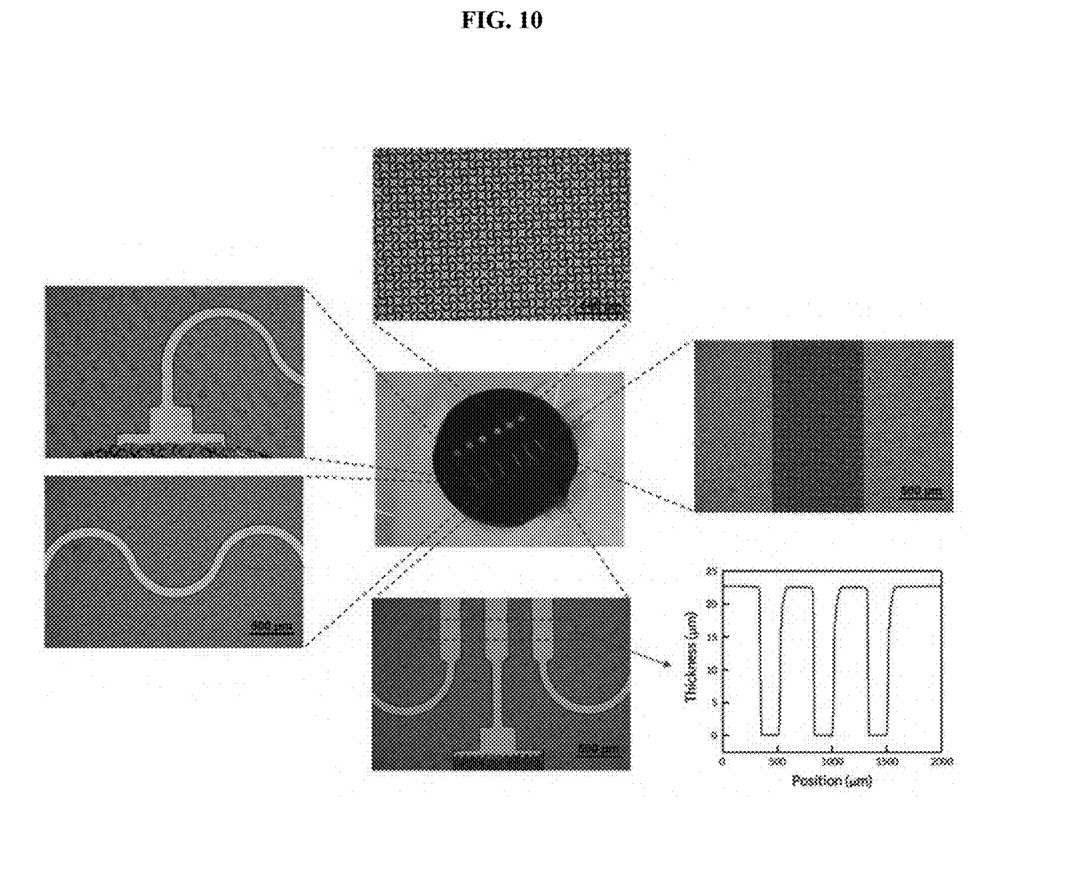
Figure 11:
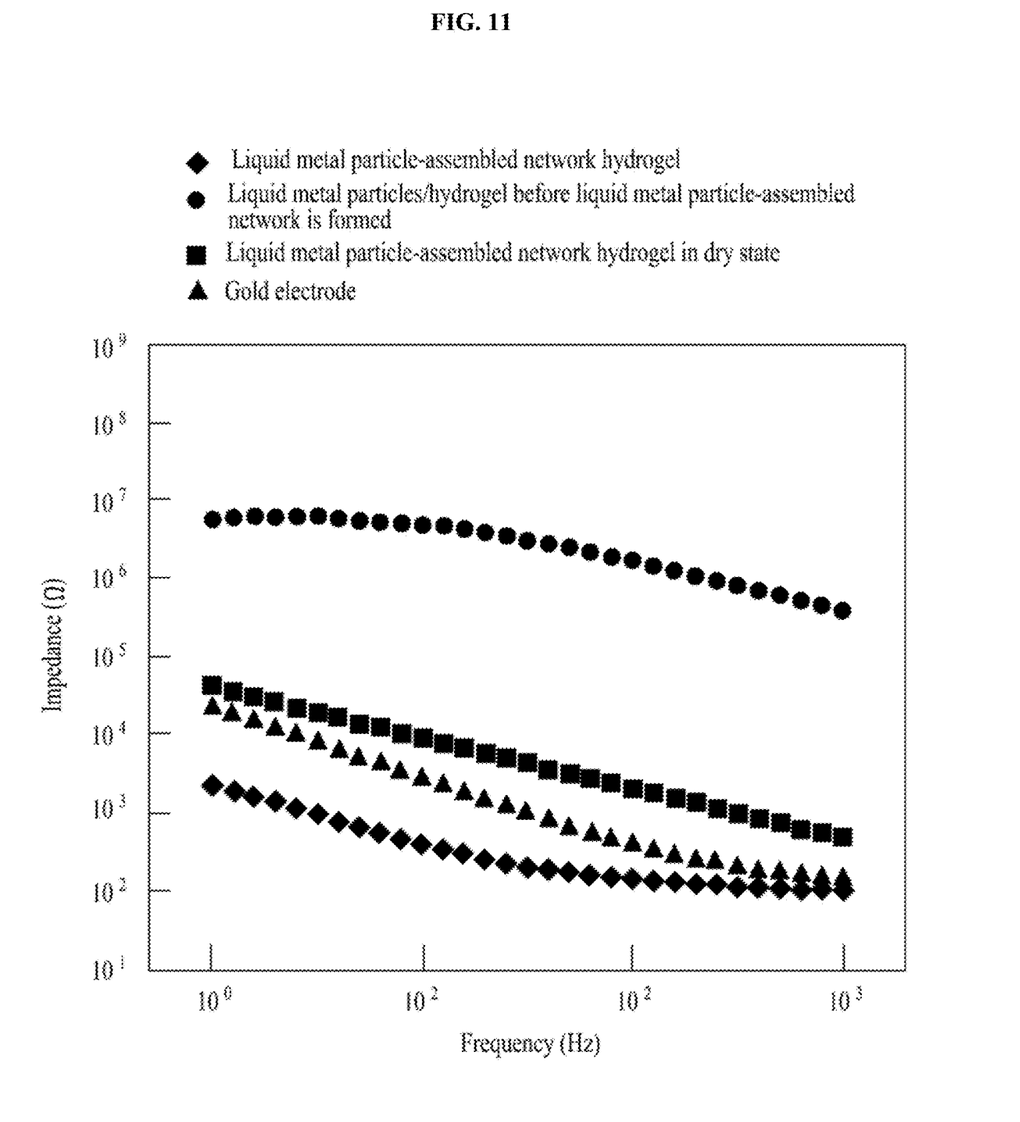

Referring to FIGS. 8A and 8B, the polymer matrix 110 of the liquid metal particle-assembled network 100 may be made of various polymers. For example, the polymer may be made of at least one of polyurethane, plastic, hydrogel, a self-healing polymer, a thermoplastic polymer (e.g., SEBS, fluorinated polymer), a silicon polymer, or hybrimer. Accordingly, the liquid metal particle-assembled network 100 may be implemented as an elastic conductor having a wide Young's Modulus and elasticity as illustrated in FIG. 8B, while maintaining excellent electrical properties, such as high electrical conductivity as illustrated in FIG. 8A. Furthermore, if the polymer matrix 110 is made of a functionalized polymer, such as a self-healing polymer, photoresist, or hydrogel, the liquid metal particle-assembled network 100 may be implemented to have various functionalities. Specifically, the liquid metal particle-assembled network 100 may be implemented to be self-healed as illustrated in FIG. 9, may be implemented in a way to be patterned using light as illustrated in FIG. 10, or may be implemented to be used for a bioelectronics having lower impedance than a gold electrode that is commonly used in an electrode to be inserted into a living body as illustrated in FIG. 11.

The liquid metal particle-assembled network 100 is a material which can overcome the limits of a common stretchable conductor, and will be widely used in various stretchable electronic devices, such as soft robotics, wearable electronics, and bioelectronics in the future.

The liquid metal particle-assembled network 100 according to various embodiments may include the polymer matrix 110, the first liquid metal particles 120 spaced apart from each other and disposed within the polymer matrix 110, and the second liquid metal particles 130 that connect the first liquid metal particles 120 between the first liquid metal particles 120 within the polymer matrix 110.

According to various embodiments, the size of each of the second liquid metal particles 130 may be smaller than the size of each of the first liquid metal particles 120.

According to various embodiments, the first liquid metal particle 120 may have a micro size, and the second liquid metal particle 130 may have a nano size.

According to various embodiments, the liquid metal particle-assembled network 100 may have electrical conductivity because the first liquid metal particles 120 and the second liquid metal particles 130 form a migration path of electrons.

According to various embodiments, when strain that the liquid metal particle-assembled network 100 is stretched in one direction is applied to the liquid metal particle-assembled network 100, the liquid metal particle-assembled network 100 may be implemented so that the polymer matrix 110 and the first liquid metal particles 120 are extended in one direction and the second liquid metal particles 130 are maintained.

According to various embodiments, the liquid metal particle-assembled network 100 may be implemented to be self-healed if the polymer matrix 110 is made of a self-healing polymer, may be implemented to be patterned using light if the polymer matrix 110 is made of photoresist, and may be implemented to be used in bioelectronics if the polymer matrix 110 is made of hydrogel.

A method of manufacturing the liquid metal particle-assembled network 100 according to various embodiments may include a step (step 410) of manufacturing ink in which a polymer solution and the first liquid metal particles 120 are mixed, a step (step 420) of forming a composite by using the ink, and a step (step 430) of forming, on a surface of the first liquid metal particles 120, the second liquid metal particles 130 that connect the first liquid metal particles 120 in the composite by applying ultrasonic waves.

According to various embodiments, the size of each of the second liquid metal particles 130 may be smaller than the size of each of the first liquid metal particles 120.

According to various embodiments, the polymer matrix 110 may be formed from the polymer solution of the ink, the first liquid metal particles 120 may be spaced apart from each other and disposed within the polymer matrix 110, and the second liquid metal particles 130 may connect the first liquid metal particles 120 between the first liquid metal particles 120 within the polymer matrix 110.

According to various embodiments, the step (step 410) of manufacturing the ink may include a step of preparing a solution including the first liquid metal particles 120 by putting liquid metal into a solvent and applying ultrasonic waves, a step of precipitating the first liquid metal particles 120 within the solvent through centrifugation for the solution, a step of obtaining the first liquid metal particles 120 by decanting the solvent, and a step of manufacturing the ink by mixing the first liquid metal particles 120 with the polymer solution.

According to various embodiments, the step (step 420) of forming the composite may include a step of preparing a polymer substrate and a step of forming the composite by forming a pattern on the polymer substrate by using the ink.

According to various embodiments, the step (step 420) of forming the composite may further include a step of removing the solvent that remains in the composite through heat treatment for the composite.

According to various embodiments, the step (step 430) of forming the second liquid metal particles 130 may include a step of putting the composite into water and a step of applying ultrasonic waves to the water. Accordingly, a surface of the first liquid metal particles 120 may be formed as the second liquid metal particles 130.

According to various embodiments, the step of applying ultrasonic waves may include a step of disposing a probe of the ultrasonicator at a distance 1 mm away from the composite and a step of applying the ultrasonic waves through the probe.

According to various embodiments, the first liquid metal particles 120 may have a micro size, and the second liquid metal particles 130 may have a nano size.

According to various embodiments, the liquid metal particle-assembled network 100 may have electrical conductivity because the first liquid metal particles 120 and the second liquid metal particles 130 form a migration path of electrons.

According to various embodiments, when strain that the liquid metal particle-assembled network 100 is stretched in one direction is applied to the liquid metal particle-assembled network 100, the polymer matrix 110 and the first liquid metal particles 120 may be implemented to be extended in one direction, and the second liquid metal particles 130 may be implemented to be maintained.

According to various embodiments, the liquid metal particle-assembled network 100 may be implemented in a way to be self-healed if the polymer matrix 110 is made of a self-healing polymer, may be implemented to be patterned using light if the polymer matrix 110 is made of photoresist, and may be implemented to be used in bioelectronics if the polymer matrix 110 is made of hydrogel.

According to various embodiments, the liquid metal particle-assembled network 100 may be implemented as a conductive material having both excellent electrical properties and mechanical properties. Specifically, the liquid metal particle-assembled network 100 may be implemented to have excellent electrical properties, that is, high electrical conductivity, and electrical properties maintained when the liquid metal particle-assembled network 100 is stretched, while maintaining mechanical properties of liquid metal particles or a polymer composite, by using a non-destructive method called ultrasonic waves. In this case, if a functionalized polymer is used in the liquid metal particle-assembled network 100, the liquid metal particle-assembled network 100 may be implemented to have various functionalities. Such a liquid metal particle-assembled network 100 is a material which can overcome the limits of a common stretchable conductor, and will be widely used in various stretchable electronic devices, such as soft robotics, wearable electronics, and bioelectronics in the future.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar components. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding components regardless of its sequence or importance, and are used to only distinguish one component from another component and do not limit corresponding components. When it is described that one (e.g., a first) component is "(functionally or communicatively) connected to" or "coupled with" the other (e.g., a second) component, one component may be directly connected to another component or may be connected to another component through another component (e.g., a third component).

According to various embodiments, each of the described components may include a single entity or a plurality of entities. According to various embodiments, one or more components or operations of the aforementioned components may be omitted or one or more other components or operations may be added. Alternatively or additionally, a plurality of components may be integrated into a single component. In such a case, the integrated component may identically or similarly perform a function performed by a corresponding one of the plurality of components before at least one function of the plurality of components is integrated.

The invention claimed is:

1. A liquid metal particle-assembled network comprising:
an elastic polymer matrix consisting of a self-healing polymer such that the liquid metal particle-assembled network is implemented to be self-healing;
first liquid metal particles spaced apart from each other and disposed within the polymer matrix; and
second liquid metal particles formed on surfaces of the first liquid metal particles that are disposed between the first liquid metal particles within the polymer matrix,
wherein the first liquid metal particles and the second liquid metal particles implement a network within the polymer matrix and form a path along which electrons are able to move, and
wherein the size of each of the second liquid metal particles is smaller than the size of each of the first liquid metal particles,
wherein the first liquid metal particles have a first surface tension and are configured to be deformed when the liquid metal particle-assembled network is stretched by a predetermined tensile force while the second liquid metal particles disposed between the first liquid metal particles have a second surface tension and are configured to maintain original shape when the liquid metal particle-assembled network is stretched by the predetermined tensile force, and the first liquid metal particles and the second liquid metal particles are configured to maintain contact when the liquid metal particle-assembled network is stretched by the predetermined tensile force.

2. The liquid metal particle-assembled network of claim 1, wherein the liquid metal particle-assembled network has electrical conductivity because the first liquid metal particles and the second liquid metal particles form a migration path of electrons.

3. The liquid metal particle-assembled network of claim 1, wherein when strain is applied to the liquid metal particle-assembled network such that the network is stretched in one direction, the liquid metal particle-assembled network is implemented so that the polymer matrix and the first liquid metal particles are extended in one direction and the second liquid metal particles are maintained.

4. The liquid metal particle-assembled network of claim 1, wherein the second liquid metal particles are derived from the first liquid metal particles by ultrasonication.

\* \* \* \* \*